United States Patent [19]

Blair

[11] Patent Number: 4,715,018
[45] Date of Patent: Dec. 22, 1987

[54] OBC LOCATION SYSTEM
[75] Inventor: Ronald B. Blair, Lewisville, Tex.
[73] Assignee: Mobil Oil Corporation, New York, N.Y.
[21] Appl. No.: 819,076
[22] Filed: Jan. 15, 1986
[51] Int. Cl.[4] .............................................. G01V 1/38
[52] U.S. Cl. ..................................................... 367/19
[58] Field of Search ................... 367/19, 130; 364/421, 364/460

[56] References Cited
U.S. PATENT DOCUMENTS

| 4,187,492 | 2/1980 | Deliquieres | 367/19 |
| 4,446,538 | 5/1984 | Zachariadis | 367/19 |
| 4,611,171 | 9/1986 | Woods | 367/19 |

OTHER PUBLICATIONS

Configurable Marine System, Geophysical Services Inc., 1982.

Primary Examiner—Nelson Moskowitz
Assistant Examiner—Ian J. Lobo
Attorney, Agent, or Firm—Alexander J. McKillop; Michael G. Gilman; Charles J. Speciale

[57] ABSTRACT

An electronic circuit is used for processing data to locate an on-bottom seismic cable wherein the first energy arrivals of seismic acoustic pulses are detected by hydrophones with an on-bottom cable and time intervals to timebreak to arrival are measured, stored and used to determine the hydrophone position and, thus, the location of the on-bottom cable.

9 Claims, 4 Drawing Figures

OBC LOCATION SYSTEM

BACKGROUND OF THE INVENTION

In present-day seismic exploration, there are several methods for acquiring data in a marine environment. The most common method is to use a marine vessel to tow a line of seismic acoustic pulse detectors behind a line of acoustic pulse generators. Unfortunately, this type of arrangement does not permit extremely long spacing between the line of acoustic pulse generators and acoustic pulse detectors. In a system where a line of acoustic pulse detectors is towed behind the acoustic pulse generator, reflection data is obtained. Reflection data is that data based upon returning acoustic waves that are reflected back from a subsurface interface or change in density. By extending the spacing between seismic pulse generators and seismic pulse detectors, refraction data may also be obtained. Refraction data is that data based upon acoustic waves that are returning back from the source side of an interface after traveling along the subsurface interface.

A method for acquiring marine seismic data which permits extended spacing between seismic pulse generators and seismic pulse detectors is the use of an on-bottom seismic cable. A seismic cable containing a plurality of hydrophones, spaced apart periodically, is placed on the floor of the ocean or a similar body of water with marker buoys at each end. A marine vessel towing a string of air guns or other acoustic pulse generators sails across lines having predetermined locations with respect to the on-bottom cable. Depending on the spacing between the acoustic pulse generators and the on-bottom cable, reflection or refraction data may be obtained. By extending the spacing between a seismic pulse source or generator and seismic pulse receivers, refraction and reflection data may be obtained.

More detailed information concerning the construction of an ocean bottom seismic cable can be found by referring to copending patent application Ser. Nos. 579,041 now abandoned, 579,042 now abandoned and 579,043 now abandoned, titled "Strain Member Chassis", "On Bottom Cable Termination" and "Jacketed Cable Section", respectively, all assigned to the present assignee.

Although an ocean bottom cable has a marker buoy at each end, the length of the cable is several miles and much irregular terrain lies between the buoys. As such, the cable will have a depth variance and a variance from a straight line connecting the two marker buoys. The depth of the ocean bottom cable can be indicated by depth detectors which may be spaced along the length of the cable. The actual location of the acoustic pulse detectors is unknown because the deviation from the straight line connecting the buoy locations is not determined and can be as great as several hundred meters.

A method for locating ocean bottom cable is taught in copending patent application Ser. No. 605,089 now U.S. Pat. No. 4,641,287, filed Apr. 30, 1984, titled "Method For Locating An On-Bottom Seismic Cable", assigned to the present assignee and incorporated herein by reference in its entirety. That application discloses a method for determining the exact position of an ocean bottom seismic cable. A plurality of spaced-apart shots are fired from an acoustic pulse source. A response to each of the shots is produced by an acoustic pulse detector on the ocean bottom cable. The travel time of each shot implies a distance between the source and detector. The distance may be used as a radius defining a spherical surface upon which the detector is located. The intersection of the spheres defined by successive shots define a circumference upon which the detector must be located. The intersection of a third sphere with the circumference thus defined produces two distinct possible locations of the detector. Depth detectors are used to control the possibilities and indicate the exact location of the detector.

SUMMARY OF THE INVENTION

The present invention pertains to seismic exploration and, more particularly, to the location of on-bottom seismic cables used to acquire reflection data and refraction data. The present invention provides an electronic circuit for receiving first energy arrivals from acoustic pulse detectors along with a timebreak input from the acoustic pulse detectors in a seismic data acquisition system. By combining the time interval between the timebreak and the first energy arrival with the travel time for the medium in which the system is operating, a travel distance is determined. Distances from the same acoustic pulse detector for different shot locations are determined. The location of the acoustic pulse detector and, thus, the location of the acoustic pulse seismic cable is determined by the intersection of spheres defined by the determined distances.

DESCRIPTION OF THE PREFERRED EMBODIMENT

Figure 1:
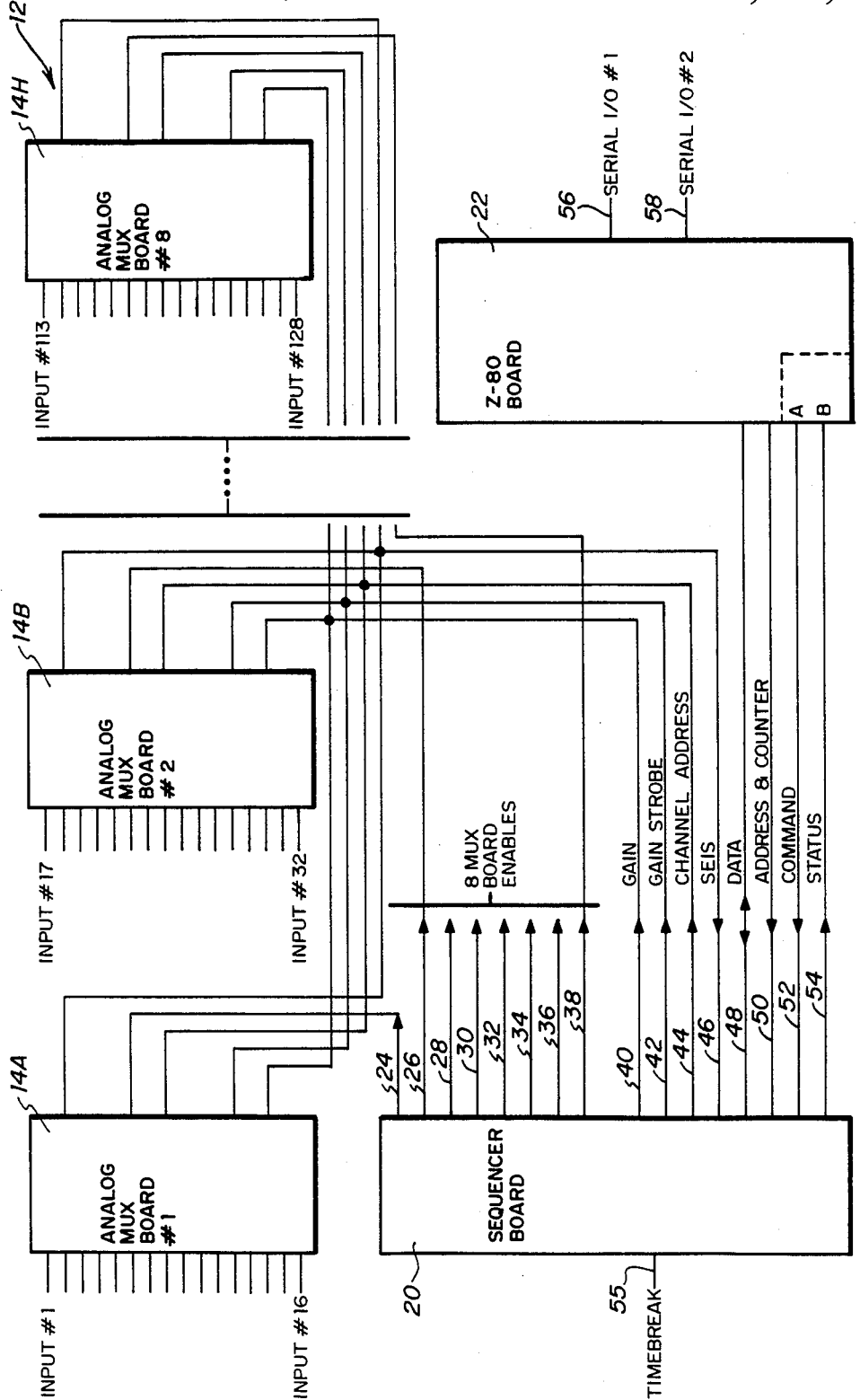
FIG. 1 is a block diagram of a detector chassis.

The present invention provides an electronic circuit used to calculate the location of an on-bottom seismic cable. FIG. 1 illustrates a detector chassis used to detect the first energy arrivals on up to 128 analog input channels and measure the time intervals from a timebreak input to each arrival. These times are stored and subsequently transferred to a computer where the hydrophone position calculation may be accomplished. FIG. 1 is a block diagram of a detector chassis 12 having analog multiplexer boards 14, 16 and 18, sequencer board 20 and Z-80 interface board 22. In the preferred embodiment, eight analog multiplexer boards are preferred; however, for ease of description, only three analog multiplexer boards are illustrated. Sequencer board 20 has eight enable outputs 24-38 to selectively enable one of the analog multiplexer boards. Sequencer board 20 also has an output 40 to indicate the gain for the enabled multiplexer board, output 42 for the gain strobe, and output 44 for the channel address, all three used to convey information to the analog multiplexer boards. Sequencer board 20 receives an input 46 of raw data from the analog multiplexer boards. Sequencer board 20 has an input-output line to Z-80 interface board 22 for the exchange of data, receives address information and counter information on line 50 from Z-80 interface board 22 along with command information on line 52 and provides status information to Z-80 interface board 22 through line 54.

Prior to the start of a detection cycle, the Z-80 interface board loads the shared random access memory (see FIG. 3) on the sequencer with a gain value and a threshold value for each channel and then arms the sequencer board 20. Once armed, the sequencer board 20 sets the gain for each channel through line 40 according to the values stored and remains idle until it receives a timebreak signal.

When a timebreak signal is received, sequencer board 20 begins sampling each input channel on line 46 and compares each channel's level to its preset threshold value. When a channel's threshold value is exceeded, the time since timebreak is stored. This detection process continues for 1.024 seconds after which sequencer board 20 signals Z-80 interface board that detection is complete. The Z-80 interface board reads the detect times from the shared RAM (see FIG. 3) and sends them to a central processing unit, preferably a Hewlett-Packard computer, via one of its serial ports for processing.

Figure 2:
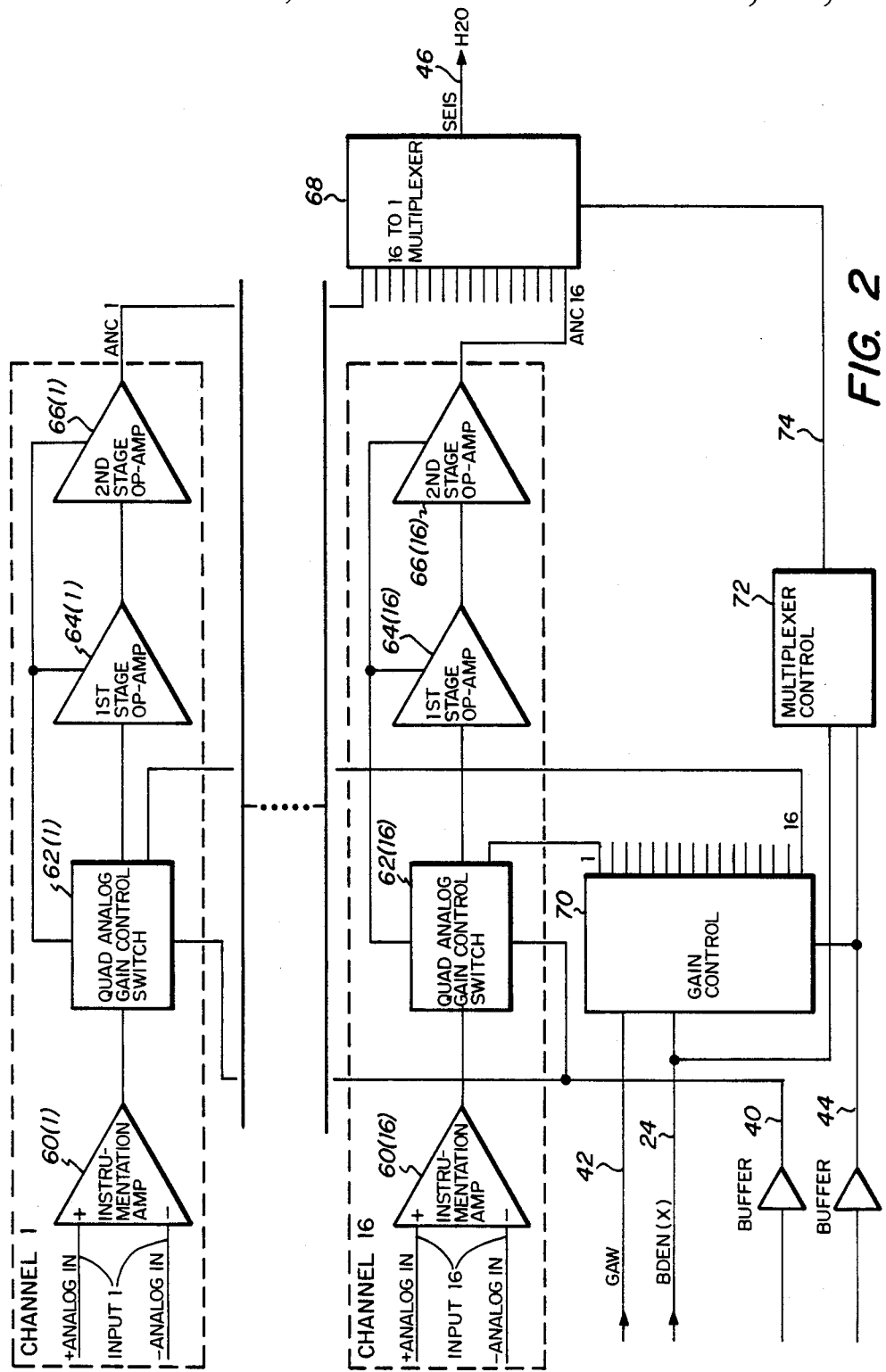
FIG. 2 is a block diagram of the analog multiplexer board of FIG. 1.

Referring now to FIG. 2, a block diagram of analog multiplexer board 14 is illustrated. All eight analog multiplexer boards are identical and may be used to receive any of the input information. Each analog multiplexer board receives inputs of 16 differential analog seismic signals, four address lines, four gain bits, one gain right strobe, and one board enable. Each board has an output of one line containing data from 16 channels that are time multiplexed. Analog multiplexer board 14 preferably has hardwired gains on the instrumentation amp of 1, 10, 100 and 1,000 and programmable gains of 1, 2, 4, 8, 16, 32, 64 and 128. The power requirements for analog board 14 are +5 volts, +15 volts, and −15 volts. As indicated previously, detector chassis 12 has eight identical analog multiplexer boards and the board input is determined by the board enable signal from sequencer board 20 on one of lines 24–38. Each analog multiplexer board receives 16 pairs of differential analog inputs from the seismic cable representing 16 seismic channels. Analog multiplexer board 14 receives inputs 1–16 from the seismic cable while analog multiplexer board 16 receives inputs 17–32, and the eighth analog multiplexer board 18 receives inputs 113–128. The output of each analog multiplexer board contains the data of all 16 channels in a time multiplexed form. This information is conveyed to sequencer board 20 through line 46.

Referring now to FIG. 2, a block diagram of the individual channel inputs is illustrated for channel 1 and channel 16. Inputs 2–15 are identical with those illustrated in channel 1 and channel 16 and have been left out for ease of description. The plus and minus inputs of input 1 for channel 1 are fed into a differential amplifier 60(1). In the preferred embodiment, the inputs are referenced to ground through 10K resistors (not shown). A gain of 1,000, 100 or 10 may be selected in instrumentation amplifier 60(1). The programmable gain for each channel is controlled by sequencer board 20 through line 40 operating on quad analog gain control switch 62(1) which controls two operational amplifiers 64 and 66. Quad analog gain control switch 62 contains four switches. If none of the switches are closed, operational amplifier 64 has a gain of 1. If the first switch is closed, the equivalent input resistance halves, and the gain of operational amplifier 64 becomes 2. If the first two switches are closed, the gain becomes 4, etc. The first three switches of the quad analog gain control switch contain the gain of operational amplifier 64. The fourth switch controls the gain of operational amplifier 66. Operational amplifier 64 has gains of 1, 2, 4 and 8. Operational amplifier 66 has gains of 1 or 16. Thus, gains 1, 2, 4, 8, 16, 32, 64 and 128 can be achieved by combining the gain of operational amplifier 64 and operational amplifier 66. Operational amplifier 66 may be equipped with a feedback resistor and capacitor to form a low pass filter to reduce high frequency noise. A capacitor may be connected to ground at the output to reduce switching noise from a multiplexer 68. Gain control circuit 70 receives inputs from sequencer board 20 through lines 42, 24 and 44. Multiplexer control circuit 72 receives inputs from sequencer board 20 through lines 24 and 44 and provides an output to multiplexer 68 through line 74. Gain control circuit 70 provides gain information to quad analog gain control switch 62 for each of the individual channels. Identical circuits for each channel are numbered similarly, the only difference being the bracketed number after the device number to indicate which channel it is functioning in.

Figure 3:
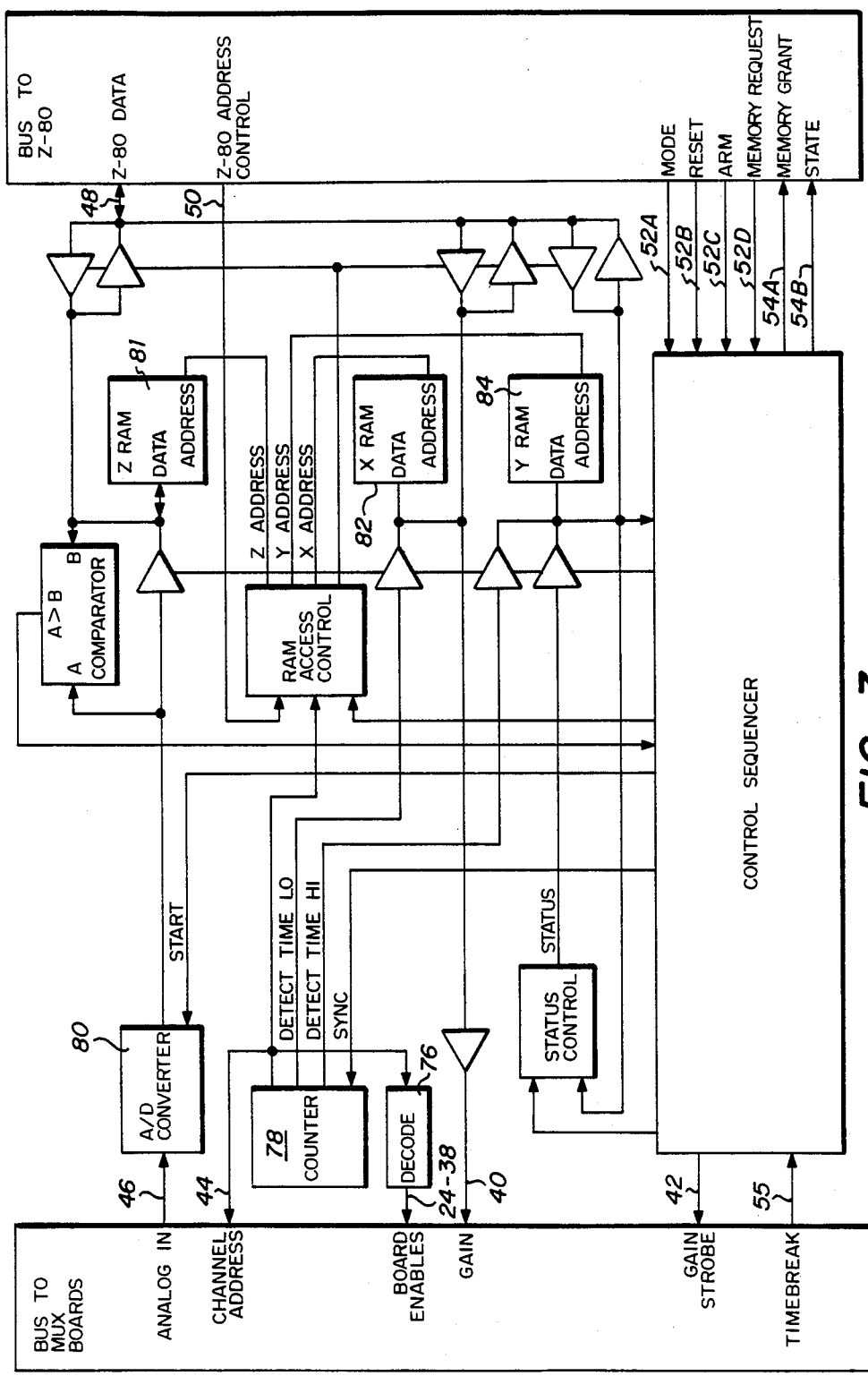
FIG. 3 is a block diagram of the sequencer board of FIG. 1.

Referring now to FIG. 3, sequencer board 20 is illustrated in block form. Lines 24–38 transmit enable signals from decode block 76 to each of the analog multiplexer boards 14A through 14H. Decode circuit 76 receives enable signals from counter 78 which simultaneously sends a channel address signal through line 44 to analog multiplexer boards 14A through 14H. Analog digital converter 80 receives analog inputs through line 46 from analog multiplexer boards 14A through 14H.

Additional input/output signals that are received or transmitted by sequencer board 20 are: gain transmitted over output 40, gain strobe transmitted over output 42, reset received over input 52B, Z-80 address received over input 50, Z-80 data transmitted and received over input/output 48, memory request received over input 52D, memory grant transmitted over output 54A, mode received over input 52A, state transmitted over output 54B, arm received over input 52C, and timebreak received over input 55.

Gain signal is a 4-bit bus used to select one of eight gain settings which have previously been discussed for the selected channel of analog multiplexer boards 14A through 14H. Gain strobe is a signal asserted by sequencer board 20 to load the gain bus into a gain register (see FIG. 2) for the selected channel.

The following signals are signals between sequencer board 20 and Z-80 interface board 22. Reset is an input from Z-80 interface board 22 which resets sequencer board 20. Z-80 address is a buffered address and control signal from Z-80 interface board 22 used to access one of shared memories Z-RAM 81, X-RAM 82 and Y-RAM 84. Z-80 data is a buffered Z-80 data bus over which data is transferred to and from shared memories Z-RAM 81, X-RAM 82 and Y-RAM 84. Memory request is an output signal asserted by Z-80 interface board 22 to request access to a shared memory. Memory grant is an input asserted by sequencer board 20 to indicate that the control of shared memory has been transferred to Z-80 interface board 22. Mode is a 2-bit output asserted by Z-80 interface board 22 at reset, and is used to put sequencer board 20 into one of four operating modes. Mode 0 is for normal operation, mode 1 is for diagnostics, and modes 2 and 3 are used for spares. State is a 2-bit output asserted by sequencer board 20 to indicate which of four states it is currently in. During normal operation, the states are as follows: 0 is idle, waiting for arm; 1 is armed, waiting for timebreak; 2 is detection, waiting for end of a detect window; 3 is post-detect, waiting for Z-80 interface board 22 to issue a memory request; arm is an output asserted by Z-80 interface board 22 to advance sequencer board 20 to state 1. Timebreak is used to trigger a detection cycle and as the event to which all time measurements are referenced. Control sequencer timing and the timing of all processes on sequencer board 20 and multiplexer boards 14A through 14H is controlled by a 23-bit binary counter 78 on control sequencer 22 and is clocked at 4.096 MHz. This clock is used to clock sequencer board 20 so that it can maintain synchronization with all processes. Synchronization is initially established by sequencer board 20 by asserting a clear to binary counter 78. Control sequencer 20 contains three RAM (random access memory), which consists of 1K by 8-bit static RAMS, of which 768 bytes are used. The three RAMS in sequencer board 20 are X-RAM 82, Z-RAM 81 and Y-RAM 84. The lower 128 bytes of X-RAM 82 and Y-RAM 84 are addressed by the sequencer as 128 status words of 16 bits each. Each status word address is assigned to a corresponding channel on multiplexer boards 14A through 14H. The upper 128 bytes of X-RAM 82 are used to store the gain value for each channel. These locations are mapped into the even bytes from 3900 to 39FF in the address space assigned to Z-80 interface board 22. Prior to detection, Z-80 interface board 22 loads this area of memory with a set of gain values which are written to multiplexer boards 14A through 14H by sequencer board 20 as it advances from state 0 to state 1.

The lower 128 bytes of Z-RAM 81 are used to store the threshold values for each channel. Each threshold is an 8-bit binary integer, representing a voltage from 0 to 4.98 volts, the same voltage as the output of A-D converter 80. Z-80 interface board 22 addresses these locations as 3A00 to 3A7F. The upper 128 bytes of Z-RAM 81 are used to store a peak value for each channel. Following a reset of sequencer board 20, from where it executes a detection cycle in which it stores the largest sample detected for each channel in the block of memory. These peak values represent the combination of noise and DC offset for each channel and are used to determine the gain and threshold values to be used during range detection. Z-80 interface board 22 addresses these locations as 3A80 to 3AFF.

Figure 4:
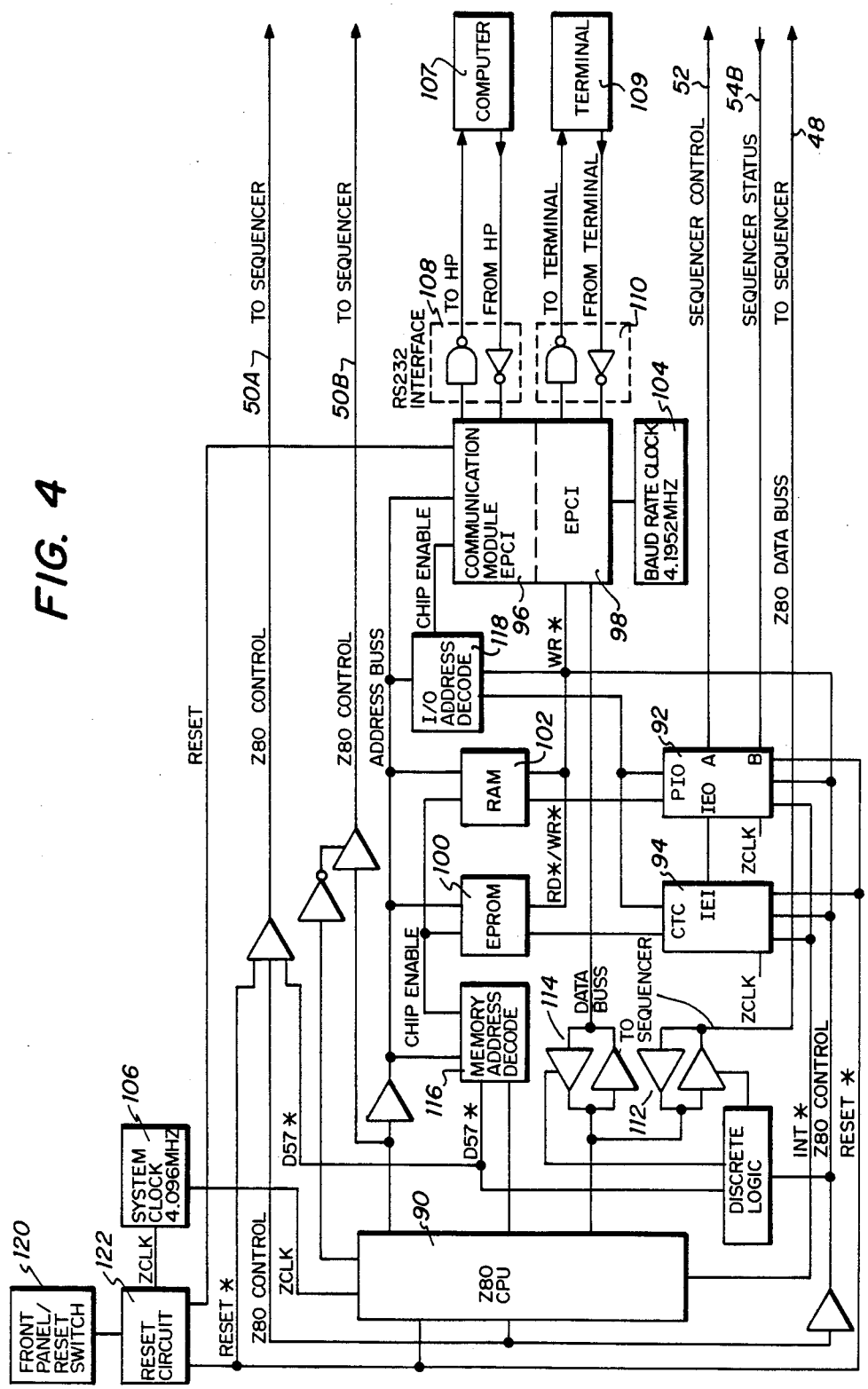
FIG. 4 is a block diagram of the Z-80 board of FIG. 1.

Referring now to FIG. 4, Z-80 interface board 22 is illustrated in block form. The main components on Z-80 interface board 22 are Z-80 central processing unit (CPU) 90, PIO (parallel input/output) circuit 92, CTC (counter timer chip) 94, EPCI (enhanced programmable communications interface) 96 and 98, EPROM (erasable programmable read-only memory) 100, RAM (random access memory) 102, and crystal oscillators 104 and 106. Z-80 interface board 22 is the interface between a main computer 107, such as an HP (Hewlett-Packard) 980 and sequencer board 20. It receives commands and parameters from the main computer. It sends gain and threshold information to control sequencer board 20 before each cycle and retrieves detect times for each channel after the cycle is completed. Z-80 interface board 22 has output control lines to sequencer board 20 and input status lines from sequencer board 20 to enable handshaking between them. It reformats the detect times and transfers them to the main computer through one serial RS232 port 108. A terminal 109 can be hooked to the other serial RS232 port 110 so that an operator can cycle the system for test purposes without the main computer. Z-80 interface board 22 transfers information to and from sequencer board 20 by accessing shared memory X-RAM 82, Y-RAM 84 and Z-RAM 81 and reading or writing into it.

The address, data and control lines run to two sets of buffers 112 and 114. Buffer 112 buffers signals between Z-80 interface board 22 and sequencer board 20. Buffer 114 buffers the signals between Z-80 interface board 22 and information exchanged within the board.

Z-80 interface board 22 runs at 2.048 MHz. derived from a 4.096 MHz. crystal oscillator 106 divided in two. The BAUD rate clock, 4.1952 MHz. is provided by crystal oscillator 104. Memory address decode 116 is a three-line to eight-line selector. It decodes the memory address during a read or write cycle to enable only the proper memory. The outputs are DS0* to DS5* for the memory within Z-80 interface board 22. DS6* is not used. DS7* is decoded when the shared memory of sequencer board 20 is addressed. The refresh signal inhibits the memory decode during Z-80 interface board 22 refresh cycle. The refresh cycle is built in part of Z-80 interface board 22 which allows it to use dynamic memory. This system uses static memory which does not need to be refreshed. EPROM 100 contains three chips and RAM 102 also contains three chips. Each chip contains 2K bytes, each being eight bits wide. The main program and diagnostic program are stored in EPROM 100 in memory locations 0000 to 17FF. The data and parameters transferred between Z-80 control 22 and sequencer board 20 and the main computer are stored in RAM 102 in memory locations 1800 to 2FFF. Each memory chip is connected to the lower eleven bits of the address bus and to all eight bits of data bus. The read and write lines from Z-80 interface board 22 determine whether data is read from or written to the enabled chip.

Input/output address decode 118 is a three-line by eight-line selector which enables the CTC, PIO or other EPCI during an input/output cycle.

PIO block 92 contains a MK 3881 parallel input/output chip. It is connected to all eight bits of the data bus, the least significant two bits of the address bus, and to some of the control lines. The lowest bit of the address bus, A0, determines whether the A or B port is selected. The next bit, A1, determines whether the data on the bus is for data or control. The A port is programmed as an output port and the B port is programmed as an input. The A port sends control information to sequencer board 20; the B port receives status from sequencer board 20. Together, they provide the handshaking necessary for Z-80 interface board 22 and sequencer board 20 to work together. PIO 92 generates interrupts which have higher priority than those of CTC 94. The following is a description of the A and B port assignments:

| A Port | | |
|---|---|---|
| A0 | PMRQ* | low when Z-80 requests shared memory |
| A1 | FG* | low for test timebreak |
| A2 | FCRDY* | low allows sequencer to go from state 0 to 1 |
| A3 | SEQRST* | low resets sequencer |
| A4 | MODE 0 | Mode bits 0 and 1 indicate modes 0-3 |
| A5 | Mode 1 | Mode 0 is normal operation mode 1 test |
| A6 | | Unused |
| A7 | | Usused |

| B Port | |
|---|---|
| B0 MGRT* | low when sequencer has released its memory to the Z-80 |
| B1 STA0 | least significant state bit |
| B2 STA1 | next to least significant state bit |
| B3–B7 | Unused |

Counter timer chip 94 is used by the program to interrupt Z-80 interface board 92 at regular intervals. It is a lower priority interrupt than PIO 92. CTC 94 is programmed by the main program during initialization using the data and control lines. Front panel 120 contains a reset switch which is used to reset the system. Reset circuit 122 uses the inputs from front panel 120 and its reset switch to issue a short reset pulse to the detector system. EPCI 96 and EPCI 98 provide serial RS232 communications with the main computer and with a local test terminal, if used. Each chip is connected to the data bus. The RD* signal from Z-80 interface board 22 determines the direction of the data flow through EPCI 96 and EPCI 98. All parameters are set by the main program during start-up. BAUD rate clock 104 provides a 4.1952 MHz. clock. RS232 interface 108 and RS232 interface 110 convert serial TTL level data output from EPCI 96 and EPCI 98 to RS232 levels and converts RS232 level signals received from the main computer or terminal into TTL compatible signals for EPCI 96 and EPCI 98.

The foregoing circuit receives first energy arrivals from acoustic pulse detectors along with the timebreak input from the acoustic pulse detectors in a seismic data acquisition system. The circuit then combines the time internal between the timebreak and the first energy arrival with the travel time for the medium in which the system is operating to determine a travel distance. Distances from the same acoustic pulse detector for different shot locations are determined. The location of the acoustic pulse detector and, thus, the location of acoustic pulse seismic cable is determined by the intersection of spheres defined by the determined distances.

While the present invention has been described by way of preferred embodiment, it is to be understood as not limited thereto, but only by the scope of the following claims.

I claim:

1. A data processing circuit for determining the location of an ocean bottom cable having at least one acoustic pulse detector which produces an electrical signal in response to remotely generated acoustic pulses fired at different locations comprising:

multiplexer circuit for receiving a plurality of analog differential seismic signal and providing a single analog time-multiplexed seismic signal comprised of a plurality of channels, each channel corresponding to one of said plural analog differential seismic signals;

sequencer circuit connected to said multiplexer circuit, said sequencer circuit receiving said time-multiplexed seismic signal from said multiplexer circuit; and processor circuit connected to said sequencer circuit, said processor circuit processing data from said sequencer circuit to locate said at least one acoustic pulse detector of said ocean bottom cable;

wherein said sequencer circuit further comprises:

means for setting a threshold value for each of said channels of said time-multiplexed seismic signal;

means for sampling said channels of said time-multiplexed seismic signal;

means for comparing each of said sampled channels of said time-multiplexed seismic signal to its channel threshold value;

means for measuring time elapsed between time of start of sampling of each of said channels of said time-multiplexed seismic signal and time when each of said sampled channels of said time-multiplexed seismic signal exceeds its channel threshold value; and means for transmitting said time measurements to said processor circuit.

2. The apparatus recited in claim 1 wherein said processing circuit further comprises:

first means for receiving a first time value when a first acoustic pulse is generated at a first location;

second means for receiving a second time value when said first acoustic pulse is received by a first acoustic pulse detector;

third means for receiving a third time value when a second acoustic pulse is generated at a second location;

fourth means for receiving a fourth time value when said second acoustic pulse is received by said first acoustic pulse detector;

fifth means connected to said first means, second means, third means and fourth means for determining the distance between the acoustic pulse generator at said first location and the first acoustic pulse detector and the distance between the acoustic pulse generator at said second location and said first acoustic pulse detector; and means connected to said fifth means for determining possible locations of said first acoustic pulse detector, said possible locations defined by the intersection of surfaces of first and second spheres, said first sphere defined by the first location of the acoustic pulse generator and the distance between said first acoustic pulse detector and said first location of the acoustic pulse genrator and said second sphere defined by the second location of the acoustic pulse generator and the distance between said first acoustic pulse detector and said second location of the acoustic pulse generator.

3. The apparatus recited in claim 2 wherein said processing circuit further comprises:

sixth means for receiving a fifth time value when a third acoustic pulse is generated at a third location;

seventh means for receiving a sixth time value when said third acoustic pulse is received by said first acoustic pulse detector;

said fifth means being further connected to said sixth means and said seventh means for determining the distance between the acoustic pulse generator at said third location and the first acoustic pulse detector; and said means connected to said fifth means further including means for determining possible locations of said first acoustic pulse detector, said possible locations defined by the intersection of said intersection of surfaces of said first and second spheres and a surface of a third sphere, said third sphere defined by the third location of the acoustic pulse generator and the distance between said first acoustic pulse detector and said third location of the acoustic pulse generator.

4. The apparatus recited in claim 1 wherein said sequencer circuit further comprises an analog to digital converter for converting said analog time-multiplexed seismic signal to a digital signal.

5. The apparatus recited in claim 1 wherein said sequencer circuit further comprises means for determining a peak value for each of said plurality of channels of said analog single time-multiplexed seismic signal.

6. The apparatus recited in claim 5 wherein said peak value for each of said plurality of channels is used to determine said threshold value for said channel.

7. The apparatus recited in claim 2 wherein said sequencer circuit further comprises an analog to digital converter for converting said analog time-multiplexed seismic signal to a digital signal.

8. The apparatus recited in claim 2 wherein said sequencer circuit further comprises means for determining a peak value for each of said plurality of channels of said analog single time-multiplexed seismic signal.

9. The apparatus recited in claim 8 wherein said peak value for each of said plurality of channels is used to determine said threshold value for said channel.

* * * * *

UNITED STATES PATENT AND TRADEMARK OFFICE
CERTIFICATE OF CORRECTION

PATENT NO. : 4,715,018

DATED : December 22, 1987

INVENTOR(S) : Ronald B. Blair

It is certified that error appears in the above-identified patent and that said Letters Patent is hereby corrected as shown below:

In the specification, page 4, lines 5-6, the reference to "Figs. 5A, 5B and 5C" are not in the patent.

Column 7, line 35, "internal" should be --interval--.

Column 8, line 44, (Claim 2, line 30) "genrator" should be --generator--.

Signed and Sealed this

Twenty-sixth Day of July, 1988

Attest:

DONALD J. QUIGG

Attesting Officer     Commissioner of Patents and Trademarks